United States Patent [19]

Hutter

[11] Patent Number: 5,098,479

[45] Date of Patent: Mar. 24, 1992

[54] AMINOACRYLATE RESINS AS THICKENERS FOR ZINC-CONTAINING METAL RESINATE INKS

[75] Inventor: G. Frederick Hutter, Charleston, S.C.

[73] Assignee: Westvaco Corporation, New York, N.Y.

[21] Appl. No.: 571,990

[22] Filed: Aug. 24, 1990

[51] Int. Cl.$^5$ .............................................. C09D 11/08
[52] U.S. Cl. ........................................ 106/30; 106/20;
524/272; 526/309; 526/312
[58] Field of Search .................... 106/30; 524/272;
526/309, 312

[56] References Cited

U.S. PATENT DOCUMENTS

| | | | |
|---|---|---|---|
| 2,610,180 | 9/1952 | Klug | 260/231 |
| 3,661,619 | 5/1972 | Surland | 427/288 |
| 4,289,678 | 9/1981 | Calder et al. | 106/30 |
| 4,528,036 | 7/1985 | Rudolphy | 106/30 |
| 4,552,592 | 11/1985 | Rudolphy et al. | 106/30 |
| 4,690,712 | 9/1987 | Janusz | 106/30 |
| 4,767,835 | 8/1988 | Janusz | 527/600 |
| 5,026,753 | 6/1991 | West et al. | 524/272 |
| 5,026,754 | 6/1991 | Pavlin | 524/272 |

*Primary Examiner*—William R. Dixon, Jr.
*Assistant Examiner*—Margaret V. Einsmann
*Attorney, Agent, or Firm*—Daniel B. Reece, IV; Terry B. McDaniel; R. L. Schmalz

[57] ABSTRACT

The invention is a hydrocarbon soluble thickener for zinc-containing metal resinate inks comprising the reaction product of:

(a) up to 99% by weight of an alkyl or cycloalkyl ester of acrylic or methacrylic acid;
(b) up to 98% by weight of styrene;
(c) 1 to 40% by weight of an amine-containing monomer;
(d) up to 20% by weight of a carboxyl-containing monomer; and
(e) a catalytic amount of a free-radical polymerization initiator.

6 Claims, No Drawings

AMINOACRYLATE RESINS AS THICKENERS FOR ZINC-CONTAINING METAL RESINATE INKS

FIELD OF INVENTION

This invention relates to novel aminoacrylate resins and the process for preparing them. In particular, this invention relates to aminoacrylate resins having properties which make them useful in formulating vehicles for gravure and intaglio printing inks.

BACKGROUND OF THE INVENTION

The high acid values common in rosins may be lowered by reacting them with zinc oxide, calcium acetate, or similar compounds to produce metallic resinates. Metal resinates are widely used as binders in gravure printing due to their rapid solvent release and their ability to prevent some basic pigments from livering. These resinates are soluble in hydrocarbons, but not in alcohol.

One of the shortcomings of using metal resinates in gravure inks has been their low solution viscosities, a byproduct of their low molecular weights. These low viscosities make it difficult to formulate inks having the desired pigment-to-binder ratios at press viscosity that are necessary for this type of printing.

Another critical property of metal resinate solutions that is directly linked to viscosity is dilutability. Viscosity is measured by the time required for an exact quantity of solution to flow by gravity through a specially sized apparatus. Dilutability is measured by the amount of solvent needed to reduce the viscosity of a given weight of resinate solution to a certain level. The typical specification calls for the volume of toluene needed to reduce 100 grams of resinate to 18 seconds as measured with a #2 Shell cup.

The usual dilutability values of commercial resinates are between 70 to 120 ml. Ink makers would like dilutabilities higher than this to be able to achieve a desirable balance of solids, color strength, and viscosity in finished inks.

To solve these problems of viscosity and dilutability with metal resinate formulations, ink makers traditionally have added small amounts of ethylcellulose or ethylhydroxyethylcellulose (EHEC) to the ink as a thickener . . . the properties of which are discussed in U.S. Pat. No. 2,610,180. EHEC owes its thickening ability to three factors: (a) a very high molecular weight, (b) a rigid molecular structure and (c) intermolecular association via hydrogen bonding of unetherified hydroxyl groups on the cellulose backbone. In this way EHEC can be used to produce a drastic reduction in resin solids at press viscosity (expressed in the industry as a "high dilution").

However, using EHEC as a thickener gives rise to other problems, as described in Leach, R.H., *The Printing Ink Manual*, Van Nostrand Reinhold Co. Ltd., London, 1988. Very small amounts of EHEC can cause substantial reductions in the gloss of an ink. Also, the cost of EHEC is relatively expensive. Finally, EHEC is only marginally compatible with metal resinates. This incompatibility seems to vary from batch to batch, and may manifest itself in phase separation of the ink upon standing.

Attempts have been made to eliminate those problems with EHEC by producing other ink thickeners. It is known to prepare printing ink binders based on reaction products of (a) natural resins, (b) other synthetic resins (for example hydrocarbon resins having a bromine number of 5 to 80) and (c) calcium compounds (and, if appropriate, other compounds of group II of the periodic system). In this process an unsaturated dicarboxylic acid (for example maleic anhydride) is reacted at the same time. This method is taught in U.S. Pat. No. 3,468,829. This process has a disadvantage in that the resulting viscous products are virtually not utilizable as printing ink binders.

Other known binders are taught in U.S. Pat. No. 4,528,036 and U.S. Pat. No. 4,552,592. Here, the binders are based on the reaction products of (a) natural resins, (b) a copolymer or a synthetic resin and (c) calcium compounds. The resulting reaction products are reacted subsequently with acetic acid to form a salt of the corresponding resin. These solutions are of relatively low molecular weights and viscosities.

Yet another known binder is the product complex formed by reaction of a metal resinate and an amine-reactive polyamide as taught in U.S. Pat. No. 4,767,835. The amine-reactive polyamide, being a condensation polymer, is of comparatively low molecular weight.

Despite the development of these, and other, thickeners EHEC remains the preferred viscosity enhancer in the field. Therefore, it is an object of this invention to produce an economical thickener of a high molecular weight and high dilutability, which exhibits an enhanced compatibility with the metal resinates commonly utilized in gravure printing inks.

SUMMARY OF THE INVENTION

This object is achieved by complex formation by reaction of the metal ions present in the resinate solution with a high molecular weight acrylic polymer containing multiple amine groups. The addition polymerization employed to create the aminoacrylate resin permits high molecular weights to be achieved.

The invention is a hydrocarbon-soluble thickener for zinc-containing metal resinate inks comprising the reaction product of:

(a) up to 99% by weight of an alkyl or cycloalkyl ester of acrylic or methacrylic acid;
(b) up to 98% by weight of styrene;
(c) 1 to 40% by weight of an amine-containing monomer;
(d) up to 20% by weight of a carboxyl-containing monomer; and
(e) a catalytic amount of a free-radical polymerization initiator.

DESCRIPTION OF THE PREFERRED EMBODIMENT

The invention that is useful as a thickener in publication gravure inks is prepared by reacting a metal resinate with an aminoacrylate resin in solution.

Suitable metal resinates must include zinc, and may include other compounds of group II of the periodic system, either alone or in combination with rosin, phenolated rosin, polymerized rosin, maleated rosin, fumarated rosin, and the like, and their mixtures. The rosin may be derived from tall oil rosin, wood rosin, or gum rosin.

Solvents suitable for use in the reaction include aliphatic and aromatic hydrocarbons.

The type of free-radical polymerization initiator suitable for use in the reaction is known in the art to depend upon the desired temperature for the reaction. Typical initiators are t-butyl peroxide, t-butyl peroxybenzoate, t-butyl peroctoate, azobisisobutyronitrile, benzoyl peroxide, and their like.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

To a 500ml flask equipped with a stirrer, reflux condenser, and two addition funnels was charged 125g of heptane. A mixture of 95g of butyl acrylate and 5g of dimethylaminoethyl methacrylate was charged to the first addition funnel. A mixture of 25g of heptane and 0.5g of tert-butyl peroxybenzoate was charged to the second addition funnel. The heptane was heated to reflux, and the contents of the two funnels were added simultaneously over 2 hours. The total charge was refluxed for an additional 3 hours, and then a mixture of 25g of heptane and 0.5g of tert-butyl peroxybenzoate was added over 30 minutes. Refluxing was continued for 3 more hours to obtain an acrylic resin solution with a measured solids content of 41.0% and a Garder-Holt viscosity of A.

A dilution comparison was made between this acrylic resin solution and EHEC utilizing the calcium/zinc resinate solution JONREZ® MR-560. (JONREZ®MR-560 is a toluene-soluble calcium/zinc resinate solution used for gravure inks, sold by Westvaco Corporation.) Dilutions were run by taking 100g of the resinate or resinate/acrylic blend and measuring the number of milliliters of toluene required to obtain a viscosity of 18 seconds with a #2 Zahn cup. Here, the MR-560 control dilution was 100; and the percentages represent dry/dry ratios of acrylic to resinate.

At 0.9%, EHEC measured 130 to the invention acrylic resin's 150. At 1.8%, EHEC measured 170 to the acrylic's 160. As stated earlier, the usual dilutability values of commercial resinates are between 70 to 120. Therefore, the invention's dilutability compared favorable with EHEC, being higher at 0.9% and lower at 1.8% respectively.

EXAMPLE 2

To a 500ml flask equipped with a stirrer, reflux condenser, and two addition funnels was charged 125g of toluene. A mixture of 98g of styrene and 2g of dimethylaminoethyl methacrylate was charged to the first addition funnel, and a mixture of 25g of toluene and 0.5g of tert-butyl peroxybenzoate was charged to the second addition funnel. The toluene was heated to reflux, and the contents of the two funnels were added simultaneously over 2 hours. The total charge was refluxed for an additional 3 hours, and then a mixture of 25g of toluene and 0.5g of tert-butyl peroxybenzoate was added over 30 minutes. Refluxing was continued for 3 more hours to obtain an acrylic resin solution with a measured solids content of 37.2% and a Gardner-Holt viscosity of M.

A dilution comparison was made between this acrylic resin solution and EHEC in the same manner as in Example 1. At 1.8%, EHEC measured 170 compared to the acrylic's 140. at 3.6%, EHEC measured 245 to the acrylic's 160. This embodiment of the invention did give an increase to the dilutability of the resinate solution, but not at the same levels as EHEC.

EXAMPLE 3

Following the method of Example 2, a series of acrylic resins were produced by varying the reactants that were introduced via the first addition funnel. In Table I below, the weights of the reactants charged into the first addition funnel are given under the "Composition" heading. The percentage of measured solids content of the acrylic is listed under "Solids". The viscosity of the acrylic on the Gardner-Holt scale is also listed; as are the comparison of dilutions as given by the method outlined in Example 1.

TABLE I

| Resin # | Composition* (in grams) | Solids | Visc. (G-H**) | Dilution in MR-560*** | | |
|---|---|---|---|---|---|---|
| | | | | 0.9% | 1.8% | 3.6% |
| 1 | 80 S/15 EHA/5 DMAEMA | 36.7 | S | 120 | 200 | |
| 2 | 60 S/30 EHA/10 DMAEMA | 39.0 | W | 140 | 180 | |
| 3 | 95 VT/5 DMAEMA | 34.3 | W-X | 120 | 150 | |
| 4 | 80 S/15 EHA/5 VP | 39.2 | B | 120 | 140 | 210 |
| 5 | 78 S/15 BA/5 DMAEMA/2 AA | 34.3 | Y | 140 | 160 | |
| 6 | 60 S/26 BA/10 DMAEMA/4 AA | 36.0 | Z5 | 140 | 170 | 190 |
| 7 | 40 S/39 BA/15 DMAEMA/6 AA | 36.0 | Z7½ | 140 | 175 | 240 |
| 8 | 40 S/39 BA/15 DEAEMA/6 AA | 37.0 | Z4½ | 130 | 140 | 180 |
| 9 | 40 S/39 BA/15 tBAEMA/6 AA | 38.0 | >Z10 | 130 | 140 | 190 |
| 10 | 40 S/39 BMA/15 DMAEMA/6 AA | 41.0 | Z9 | 180 | 280 | |
| 11 | 40 S/39 BA/15 DMAEMA/6 MAA | 37.0 | Z3 | 120 | 150 | 200 |
| | EHEC | | | 130 | 170 | 245 |

*AA = acrylic acid
BA = butyl acrylate
BMA = butyl methacrylate
DEAEMA = diethylaminoethyl methacrylate
DMAEMA = dimethylaminoethyl methacrylate
EHA = 2-ethylhexyl acrylate
MAA = methacrylic acid
S = styrene
tBAEMA = t-butylaminoethyl methacrylate
VP = 4-vinylpyridine
VT = vinyltoluene
**Gardner-Holt scale
***Parts dry additive on dry resinate As shown above, while the viscosity and dilutability varied from resin to resin, all did show an ability to thicken the metal resinate solution.

A more preferred embodiment of the invention was produced with the addition of acrylic acid to obtain an amphoteric polymer (resins No. 5–10 above). This increased dilutability by enhancing interchains interactions, while helping the solvent release by marginalizing the solubility in toluene.

EXAMPLE 4

To a 2L flask equipped with a stirrer, reflux condenser, and two addition funnels was charged 224g of toluene. A mixture of 70.2g of styrene, 36g of butyl acrylate, 36g of butyl methacrylate, 27g of dimethylaminoethyl methacrylate and 10.8g of acrylic acid was charged to the first addition funnel. A mixture of 0.9g of tert-butyl peroxybenzoate and 36g of toluene was charged to the second addition funnel. The toluene was heated to reflux, and the contents of the two funnels were added concurrently at reflux over 1 hour. The charge was refluxed for an additional 3 hours, and then a mixture of 0.9g of tert-butyl peroxybenzoate and 36g of toluene was added over 15 minutes. The charge was refluxed for an additional 3 hours, and then another mixture of 0.9g of tert-butyl peroxybenzoate and 36g of toluene was added over 15 minutes. Again, the charge was refluxed for an additional 3 hours. At that time the heat to the reaction was removed, and 688g of toluene was added. This resulted in an acrylic resin solution with a measured solids level of 15±1% and Gardner-Holt viscosity of about J.

A screening evaluation was made between this most preferred embodiment of aminoacrylate resin in solution and EHEC utilizing JONREZ® MR-584 (JONREZ® MR-584 is a toluene-soluble calcium/zinc resinate solution used for gravure inks, sold by Westvaco Corporation) rubine grind base, letdown with JONREZ® MR-560. Inks were made for the invention resin and EHEC at 0.5%, 1.0%, and 1.5% dry weight, and all six inks were compared for viscosity and dilution. Inks containing the invention resin at 1.0% dry were also compared versus 0.5% dry EHEC ink for gloss, color development, holdout, solvent release and rub resistance. When compared to EHEC, the invention showed superior gloss and color strength, and remained in solution better in both full strength and diluted inks. The invention retained 100% of its gloss after being diluted for 24 hours.

Table II shows the viscosities and dilutions obtained from the six inks tested.

|  | MR-584/MR-560 EHEC | | | MR-584/MR-560 Invention | | |
| --- | --- | --- | --- | --- | --- | --- |
|  | 0.5% | 1.0% | 1.5% | 0.5% | 1.0% | 1.5% |
| Brookfield, centipoise viscosity at full strength | 250 | 470 | 650 | 240 | 1,360 | 2,920 |
| Cut with 80 ml of toluene to 100 g (Shell #2 cup) in seconds | 17.8" | 28.4" | 45.4" | 14.2" | 17.6" | 26.1" |

At two times the Standard level of EHEC, the invention was effective in producing the increased dilution commonly obtained with EHEC. Increased levels of the invention resulted in increased viscosity and dilution.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A process for the production of hydrocarbon-soluble thickeners for zinc-containing metal resinate inks which comprises reacting:
   (a) 2 to 60% by weight of an alkyl or cycloalkyl ester of acrylic or methacrylic acid;
   (b) 20 to 70% by weight of styrene;
   (c) 1 to 30% by weight of an amine-containing monomer;
   (d) 1 to 15% by weight of a carboxyl-containing monomer; and
   (e) a catalytic amount of a free-radical polymerization initiator.

2. The process of claim 1 in which in the reactants contain the following limits:
   (a) 15 to 25% by weight of butyl acrylate and 15 to 25% by weight of butyl methacrylate;
   (b) 30 to 58% by weight of styrene;
   (c) 10 to 20% by weight of dimethylaminoethyl methacrylate;
   (d) 2 to 12% by weight of acrylic acid; and
   (e) a catalytic amount of a free-radical polymerization initiator.

3. The product of the process of claim 1.

4. The product of the process of claim 2.

5. A zinc-containing metal resinate printing ink containing the product of claim 3.

6. A zinc-containing metal resinate printing ink containing the product of claim 4.

* * * * *